INVENTOR.
Fred Krahulec
Michael R. Siuda
BY Schroeder, Hofgren,
Brady & Wegner
Attys.

Aug. 1, 1961 F. KRAHULEC ET AL 2,994,537

RECORD CHANGER

Filed Dec. 14, 1956 3 Sheets-Sheet 2

INVENTORS.
Fred Krahulec
Michael R. Siuda
BY Schroeder, Hofgren, Brady & Wegner
Attys.

INVENTORS:
Fred Krahulec
Michael R. Siuda
BY Schroeder, Hofgren, Brady & Wegner
Attys.

United States Patent Office 2,994,537

Patented Aug. 1, 1961

2,994,537

RECORD CHANGER

Fred Krahulec, Skokie, and Michael R. Siuda, Oak Lawn, Ill., assignors, by mesne assignments, to Warwick Manufacturing Corporation, Chicago, Ill., a corporation of Delaware Filed Dec. 14, 1956, Ser. No. 628,390

12 Claims. (Cl. 274—10)

This invention relates to a record changer, and more particularly to such a device capable of both manual and automatic operation.

An object of this invention is to provide a new and improved record changer for automatic playing of records requiring one or the other of two different speeds and manual playing of records of several different sizes and speeds which is of a relatively simple construction and is therefore easy and inexpensive to manufacture.

Another object of the invention is to provide a record changer in which a record changing cycle may be initiated by the tone arm after the completion of a record with a minimum amount of force exerted by the tone arm.

A further object of the invention is to provide a record changer having a turntable provided with an actuating cam with an inclined terminal section on its underside, an actuator arm and a tone arm connected together for simultaneous raising and lowering movements and movement laterally of the turntable, a pivotally mounted trip wire for raising the actuator arm to place a cam follower on the end of the actuator arm into the area of the cam when the trip wire is pivoted by the terminal section of the cam, and means carried on the actuator arm for pivoting the trip wire into engaging position with the cam terminal section when the tone arm completes the tracking of a record.

An additional object of the invention is to provide a record changer, as defined in the preceding paragraph, wherein the trip wire has an L-shaped section extending downwardly from the motorboard of the record changer and transversely beneath the level of the actuator arm and has an angled, upper trip end positioned adjacent the path of the cam terminal section, and wherein said means comprises a permanent magnet carried on the actuator arm to lie to one side of the trip wire when adjacent thereto to attract a magnetic armature on the trip wire and exert the pivoting action on the trip wire to place the angled trip end of the trip wire in the path of the cam terminal section so that said section may further pivot the trip wire as the turntable rotates and cause the L-shaped trip wire section to raise the actuator arm and cam follower into the area of the cam.

Still another object of the invention is to provide a record changer having an actuator arm for controlling the operation of record dropping mechanism for dropping a record from a stack onto a turntable and the movements of a tone arm in a record changing cycle in which the actuator arm is pivotally mounted for elevation on a rotatably mounted tone arm shaft, a tone arm pivotally mounted on the tone arm shaft for raising and lowering movements with respect to the turntable, and direct sliding connections between the actuator arm and tone arm for transmitting raising and lowering movements to the tone arm corresponding to those of the actuator arm.

Still another object of the invention is to provide a record changer having a turntable including manually settable means for driving the turntable at a plurality of different speeds, a movable trip member for initiating a record change cycle including movements of a tone arm, means for yieldably moving the trip member at the completion of playing a record to initiate a change cycle, and means automatically effective at certain turntable speeds for blocking the trip member against movement to permit manual operation of the tone arm.

An additional object of the invention is to provide a record changer having a pivotally mounted trip wire for raising an actuator arm and cam follower into the area of an actuating cam, means to initially pivot the trip wire into operative relation with the cam when a tone arm completes the playing of a record, a movable lever having an end with a pair of spaced legs forming a U-shape lying on opposite sides of the trip wire wherein the lever has a neutral position in which one leg thereof is spaced from the trip wire to permit normal operation of the trip wire, and means for holding the lever in another position of rotation wherein the last-referred-to leg is closely adjacent the trip wire to prevent normal movement of the trip wire so as to permit manual operation, said lever when manually rotated in the opposite direction causing the second of said legs to initially pivot the trip wire to initiate a record changing cycle.

The objects of the invention generally set forth, together with other ancillary advantages, are attained by the construction and arrangement shown by way of illustration in the accompanying drawing, in which.

Figure 1:
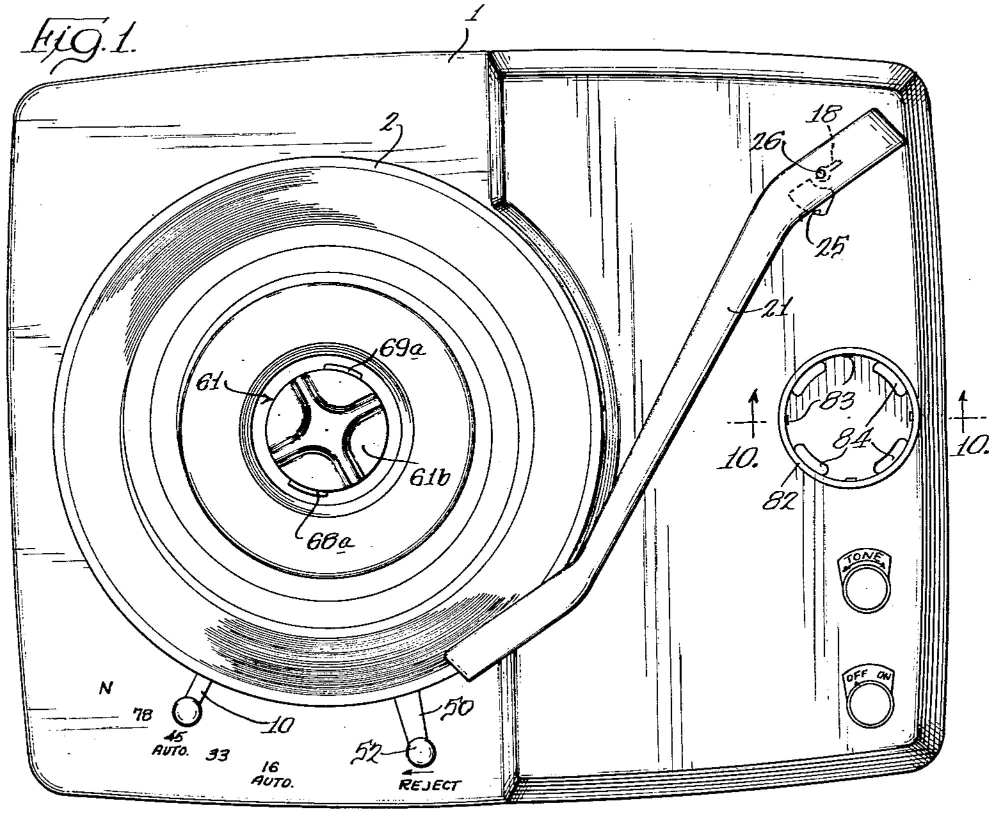
FIG. 1 is a plan view of the record changer.

While this invention is susceptible of embodiment in many different forms, there is shown in the drawing, and will herein be described in detail, an illustrative embodiment of the invention with the understanding that the present disclosure is to be considered as an exemplification of the principles of the invention and is not intended to limit the invention to the embodiment illustrated. The scope of the invention will be pointed out in the appended claims.

A motorboard 1 is provided with a turntable 2 of a size to be substantially coextensive with a 7" record. The turntable has a peripheral rim 3, and an idler roller 4 rolls on the rim for transmitting rotation from a 4-speed drive mechanism, including a motor shaft 5 and a drive shaft 6 driven from the shaft 5 by a belt 7. The shaft 6 is carried on a plate 8 pivotal about the drive shaft 5. The shafts 5 and 6 have two pulley sections thereon, each of a different diameter, and the idler roller 4 may shift axially to engage one or the other of the pulley sections on the shafts 5 or 6. The axial position of the idler roller 4 is determined by cam means on plate 8, indicated generally at 9, and, in combination with a rotative position of shaft 6, determines the position of the idler roller 4 and the speed of the turntable. Suitable detent means may be provided to hold the plate 8 in the manually selected position. The plate 8 is connected to a handle 10. The drive mechanism forms no part of this invention, and reference may be had to the co-pending application of Ernest O. P. Tatter, Serial Number 616,024, filed October 15, 1956, for a complete disclosure of a suitable drive mechanism.

The turntable 2 (FIG. 2) is force fitted on a pin 11, fitted in an Oilite bearing 12, placed in a bushing 13, fitted in the motorboard 1.

A bracket 14 depends from a corner of the motorboard 1, remote from the turntable. A tone arm shaft 15 is rotatably seated in the bracket and extends upwardly through an opening 16 in the motorboard. A cross pin 17 extends through the tone arm shaft 15 and prevents withdrawal of the shaft from the motorboard after insertion thereof through the opening 16 and an opening 18 (FIG. 1) in the motorboard and 90° rotation. The upper end of the tone arm shaft has a pivot pin 20 on which one end of a tone arm 21 is pivotally mounted for raising and lowering movement. The tone arm at the other end may carry a cartridge, including a needle for tracking a record.

The parts are shown in the positions they occupy when commencing the playing of a record.

A pivot pin 22 extends through the tone arm shaft 15 near the lower end thereof on which an actuator arm 23 is pivotally mounted for raising and lowering movement in elevation. Movements of the actuator arm 23 laterally of the motorboard 1 result in rotation of the tone arm shaft 15 to obtain corresponding movement of the tone arm. Raising and lowering movement of the actuator arm 23 causes corresponding movement of the tone arm 21 by sliding engagement of an upturned elevator arm 24 on the actuator arm 23 with an abutment screw 26 on the tone arm, which screw is adjustable to permit height adjustment of the tone arm. The elevator arm 24 extends up through an elongated opening 25 in the motorboard. The releasable engagement between the elevator arm and the abutment screw permits easy elevating movement of the tone arm when in manual operation.

Figures 2, 6, 7, 7A, 8:
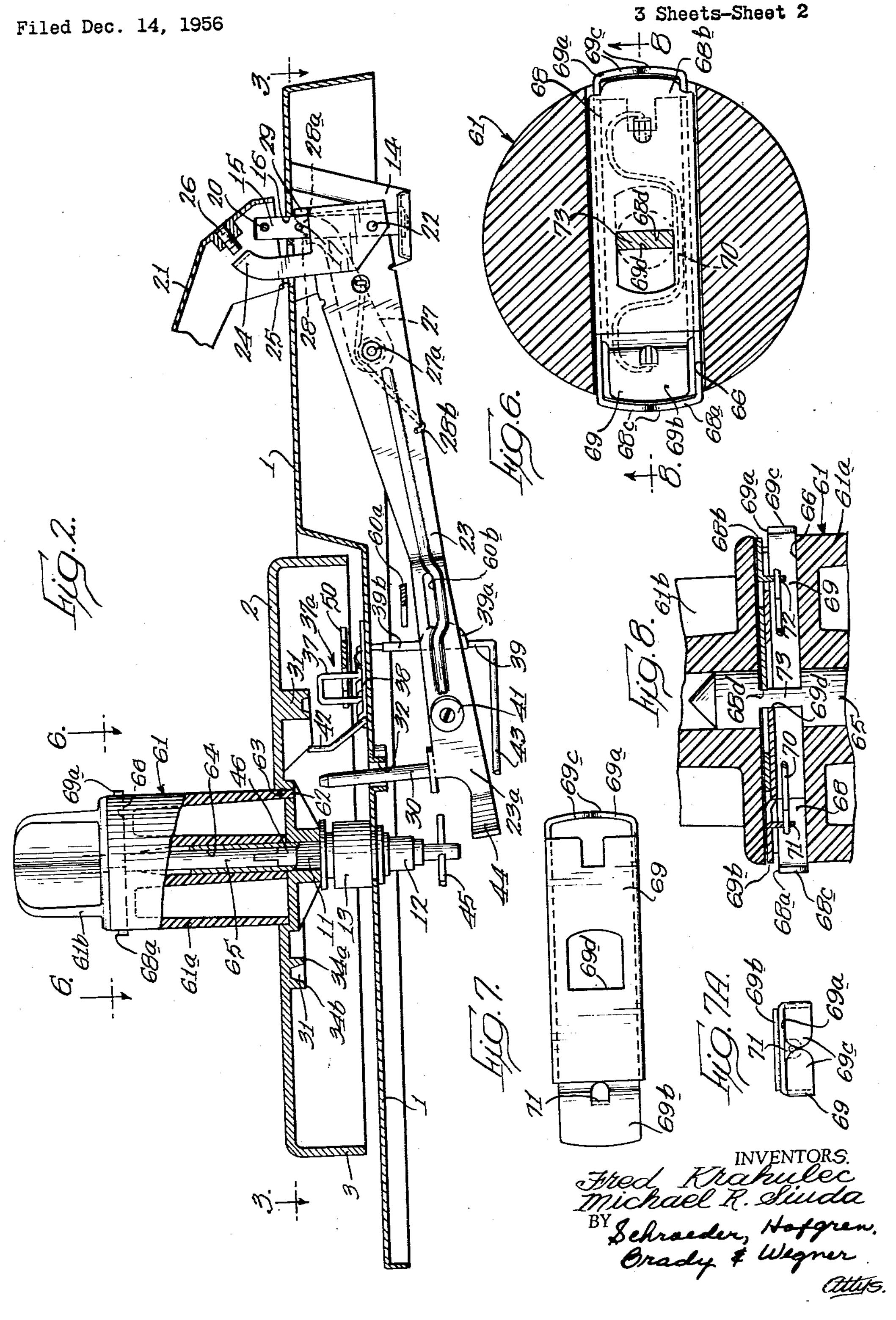
FIG. 2 is a vertical section taken generally along the line 2—2 in FIG. 3, with parts broken away.
FIG. 6 is a horizontal section through the record storage spindle taken generally along the line 6—6 in FIG. 2.
FIG. 7 is a plan detail of one record spindle plate.
FIG. 7A is an end elevation of the plate shown in FIG. 7.
FIG. 8 is a generally vertical section taken along the line 8—8 in FIG. 6.

The actuator arm 23 is maintained in either of two, vertically adjusted positions by a detent arm 27 pivotally mounted on the actuator arm by a pin 27*a*. The detent arm has a pair of notches 28 and 28*a* which alternately engage the cross pin 17 on the tone arm shaft to maintain the actuator arm 23 in either of two positions of elevation. A spring 28*b* acts to maintain the detent arm in engagement with the cross pin. As shown in FIG. 2, the elevator arm 24 and abutment screw 26 are out of engagement when the actuator arm 23 is in its lower position. This is caused by the lowering of the tone arm onto a record while the actuator arm continues to move until a flange 29 on the actuator arm engages the tone arm shaft 15.

The actuator arm 23, adjacent its end 44 opposite to its pivoted end, carries a vertically extending cam follower 30 which is selectively engageable with a cam 31 formed on the underside of the turntable when the actuator arm is in its raised position. The cam follower 30 travels in an elongated, curved opening 32 in the motorboard 1.

Figure 5:
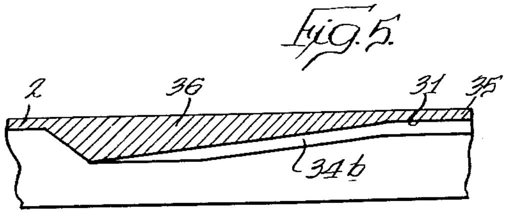
FIG. 5 is a vertical section of the cam terminal section taken generally along the line 5—5 in FIG. 3.
Figures 3, 9:
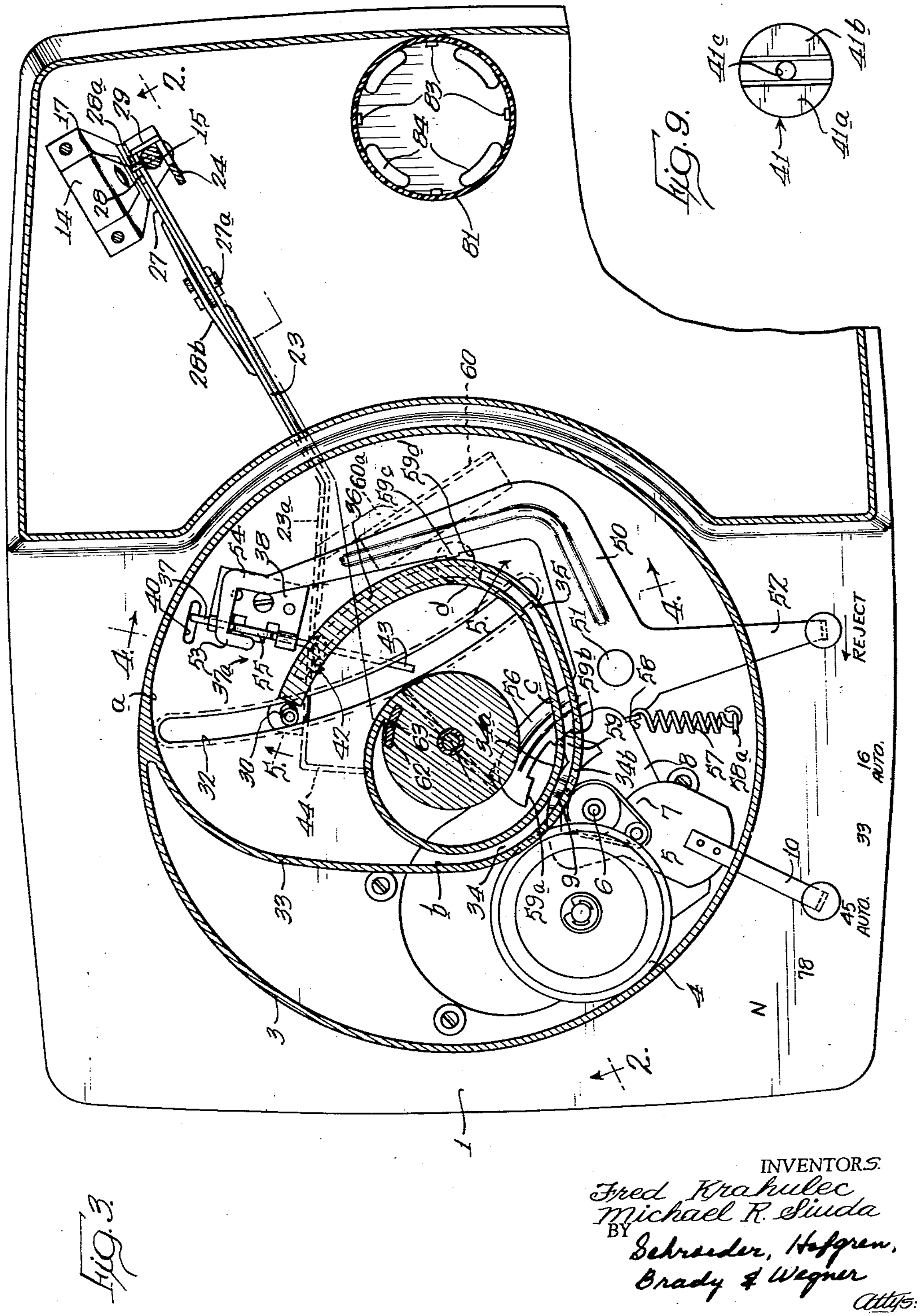
FIG. 3 is a horizontal section taken generally along the line 3—3 in FIG. 2.
FIG. 9 is a detail of a permanent magnet carried on the actuator arm for the record changer.

The cam 31 on the underside of the turntable has an actuator arm lead-in section 33 in the form of a wall extending generally between points *a* and *b* in FIG. 3 with a decreasing radius with respect to the turntable axis and shaped to produce a smooth, harmonic motion of the actuator arm 23. A first constant radius section 34 of the cam extends generally between points *b* and *c*, shown in FIG. 3, and is formed as a groove having walls 34*a* and 34*b*. A continuation of the groove between points *c* and *d* forms a lead-out section 35 of the cam which is of increasing radius with respect to the turntable axis of rotation and shaped to produce a harmonic motion of the actuator arm. A terminal section 36 of the cam extends beyond point *d* and is a groove of slightly decreasing radius to compensate for effective lengthening of the actuator arm in elevating movement to provide a fixed set-down point for the tone arm 21 and is downwardly inclined away from the plane of the turntable, as shown in FIG. 5. The walls 34*a* and 34*b* along terminal section 36 of the cam also are inclined downwardly.

The upward movement of the actuator arm 23 is effected by a trip member, indicated generally at 37*a*. The trip member 37*a* includes a trip wire 37 of non-magnetic material pivoted on top of the motorboard 1 and held thereon by a plate 38 and a magnetic armature 39*a* on a section 39 of the trip wire which extends downwardly through an opening 40 in the motorboard. The armature has a leg 39*b* which is spot welded to section 39. A permanent magnet 41 of the alnico type is carried on the actuator arm 23 to coact with the armature 39*a*. As the tone arm completes the tracking of a record and moves beyond the sound groove and on the terminal groove of a record to move the actuator arm outwardly, the magnet 41 is effective to exert a pull on the armature 39*a* and section 39 of the trip wire which pivots the trip wire to swing an angled, upper trip end 42 of the trip wire slightly clockwise, as seen in FIG. 2, to a raised position in the path of the inclined terminal cam section 36 of the cam on the turntable. As the turntable rotates clockwise, as shown in FIG. 2, the terminal cam section 36 engages the trip end 42 of the trip wire, the trip wire pivots a further distance in the same direction to cause an actuating end 43 of the trip wire to engage and raise the actuator arm 23 and shift the detent arm 27 which holds the actuator arm in its raised position with the tone arm 21 raised from the record and the cam follower 30 in the general area of cam 31.

The section 39 and actuating end 43 of the trip wire form an L-shaped section of the trip wire extending down from the motorboard.

When the trip wire 37 is in normal, rest position, the angled, upper trip end 42 of the trip wire lies below the cam 31 on the underside of the turntable and to one side of the terminal cam section 36, as shown in FIG. 3. When the magnet 41 exerts a force on the trip wire, this results in pivoting the trip wire to a position in which the actuating end 43 of the trip wire engages the underside of the actuating arm 23, and the trip end 42 is raised into operative position in the path of cam terminal section 36 by the pivoting movement. The trip end 42 is of a length to not reach the parts of cam 31 other than terminal section 36 when raised, which avoids contact with the other parts of cam 31. As shown in FIG. 5, the cam terminal section 36, including associated parts of walls 34*a* and 34*b*, are inclined away from the turntable 2.

Figure 4:
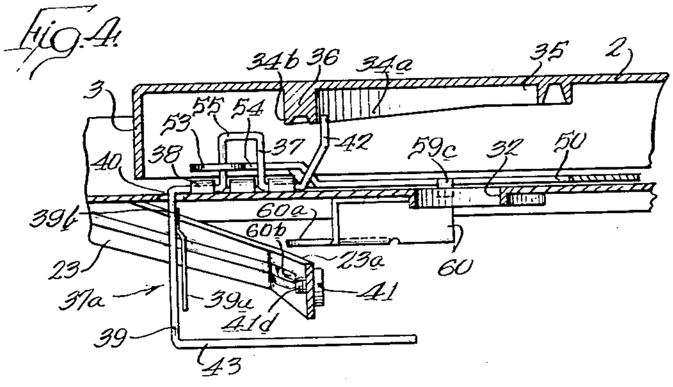
FIG. 4 is a vertical section taken generally along the line 4—4 in FIG. 3.
Figure 10:
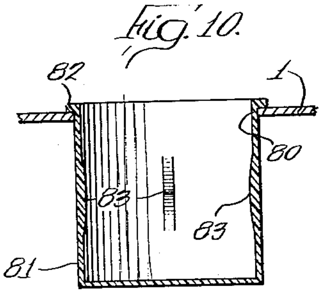
FIG. 10 is a vertical section taken generally along the line 10—10 in FIG. 1.

The magnet 41 is basically a U-shaped member with legs 41*a* and 41*b* (FIG. 9) each being respectively either a north or south magnetic pole. This results in having lines of magnetic force extend out from its face and, as the magnet approaches the intermediate section 39 of the trip wire, the intensity of magnetic force acting on the trip wire armature 39*a* becomes such to move the trip wire. The magnet 41, when effective on the armature 39*a*, lies to one side of the pivotal mounting 38 for the trip wire, or to the front thereof, when looking at FIG. 4, and is carried on a bent section 23*a* of the actuator arm to exert a force generally normal to the pivot axis of the trip member 37. This provides a trip action with any force generated on the needle actually an attractive force which acts in the same direction as the record terminal groove. An opening 41*c* in the magnet may receive a bolt 41*d* to permit its attachment to the actuator arm 23.

With the cam follower 30 in raised position, rotation of the turntable 2 and cam 31 will cause the lead-in section 33 of the cam to engage the follower and swing the actuator arm 23 toward the turntable center which moves the tone arm 21 oppositely to a position beyond the turntable sufficient to permit dropping of a record from a record dropping spindle. Just prior to the cam follower 30 reaching the first constant radius section 34, a flanged end 44 of the actuator arm 23 engages a pin 45 carried at the lower end of a record drop actuating shaft 46. This engagement continues while the cam follower 30 travels along the first constant radius section 34 to hold the tone arm 21 out while dropping a record, as more fully set forth hereinafter. The cam follower 30 then moves into the lead-out section 35 of the cam to move the actuator arm 23 outwardly which releases the pin 45 and to move the tone arm 21 inwardly to a set-down position, at which time the cam follower 30 moves onto the inclined terminal cam section 36 of constant radius to lower the actuator arm and the tone arm onto a record and shift the detent arm 27. The inclined cam section gives a controlled descent to the tone arm 21. The flange 29 on the actuator arm 23 engages the tone arm shaft 15 to limit the lower position of the actuator arm.

A manually operable lever 50 is pivoted beneath the turntable and on top the motorboard by a rivet 51 for effecting reject operation of the record changer. The lever has a handle end 52 and a pair of legs 53 and 54 forming a U-shaped end disposed adjacent an inverted U-shaped section 55 of the trip wire 37 disposed above the motorboard. In a reject operation, the lever is pivoted clockwise, as viewed in FIG. 3, to have leg 53 engage and pivot the trip wire in the same direction as effected by the magnet 41 to initiate a record change operation. This operation is only effective in a certain range of actuator arm positions. This range coincides with the playing area of a 7" record and is determined by the length of the actuating end 43 of the trip wire. If the actuating arm 23 is beyond the reach of actuating end 43, then the actuating arm will not be shifted. Thus, the lever 50 may be moved at any time, but is only effective on the actuator arm when the latter is in range of the lower end of the trip wire.

The lever 50, as shown in FIG. 3, is in a position which permits automatic operation of the record changer. Movement of the lever 50 counterclockwise, as viewed in FIG. 3, places the record changer in manual operation by placing leg 54 of lever 50 adjacent the U-shaped section 55 of the trip wire 37 to limit movement of the trip wire by the magnet 41 to an extent insufficient to place the trip end 42 of the trip wire in operative relation with the cam terminal section 36. The position of lever 50 between automatic operation and manual operation positions is automatically controlled by the speed selector mechanism including the handle 10. The lever 50 has an arm 56 which extends alongside the speed selector mechanism. The lever 50 is urged counterclockwise by a spring 57 connected thereto at 58 and to the motorboard at 58*a*. The plate 8 connected to the speed selector handle 10 carries a projecting lug 59 having tapered sides which selectively coacts with a pair of spaced faces 59*a* and 59*b* on the arm 56. When the speed selector is set to drive the turntable at either 16 r.p.m. or 45 r.p.m., the plate 8 is positioned to have the lug 59 engage either the arm face 59*a* or 59*b*, respectively, to maintain the lever 50 in its position for causing automatic operation of the record changer. As shown in FIG. 3, the handle 10 is set at a 45 r.p.m. speed and this places lug 59 in engagement with arm face 59*b* to hold lever 50 in automatic position against the urging of the spring 57. When the speed selector is set to provide either 33 or 78 r.p.m. speed for the turntable, the lever 50 is moved counterclockwise from its automatic position by the spring 57, and the movement is permitted by the absence of lug 59 from adjacent either of the arm faces 59*a* and 59*b*. The lever 50 is limited in its movements by a downwardly extending tab 59*c* formed thereon which fits within an opening 59*d* in the motorboard 1. Thus, in manual operation, a 7", 10" or 12" small hole record may be played at 33 or 78 r.p.m. by removal of a large hole record spindle, as set forth more fully hereinafter. The opening 32 in the motorboard is long enough to permit the cam follower 30 to travel past the center of the turntable, as when playing a 12" record.

It is believed obvious that the particular speeds referred to in describing the structure are for purposes of illustration only and other speeds may be utilized which would still fall within the scope of the invention.

A channel 60 secured to the motorboard 1 prevents the actuator arm 23 from raising into following relation with the cam 31 on the turntable when the actuator arm 23 is under the wrong side of the turntable as when in manual operation, and the record changer is jarred. The channel has a projecting finger 60*a* which moves into a slot 60*b* in the actuator arm 23 to hold the arm up when in engagement with record drop pin 45.

A cylindrical record spindle 61 for large hole records is formed of a detachable, two-piece post having a lower part 61*a* and an upper part 61*b* secured together by means such as cement. The spindle rests on the turntable and has a flange 62 keyed in a slot 63 in the turntable to cause rotation therewith. A vertical bore 64 in the spindle part 61*a* fits on the pin 11 which may form a small hole record spindle when the spindle 61 is removed. An extension 65 of the record drop actuating shaft 46 is removably keyed thereto and extends within a hollow, upper end of the pin 11. A transverse slot 66 extends through the spindle 61 and is formed by a space between spindle parts 61*a* and 61*b*. The slot 66 receives a pair of interfitted plates 68 and 69 each with opposite ends forming a record supporting shelf and a separator blade. The plates 68 and 69 have shelves 68*a*, 69*a* and blades 68*b*, 69*b*, respectively, the shelves being formed respectively by turned-in ends 68*c* and 69*c* of the plates 68 and 69. A tension spring 70 connects between a pair of tabs 71 and 72 on the plates 68 and 69, respectively, tending to urge them in a direction to extend shelves 68*a* and 69*a* out beyond the wall of the spindle 61. The plate 69 is shown in detail in FIGS. 7 and 7A. The plate 69 is of a width sufficiently less than plate 68 so as to slidably fit therein.

The actuator shaft extension 65 has a cam 73 adjacent its upper end formed by recessing a part of the shaft in engagement with edges 68*d* and 69*d* of cutouts in plates 68 and 69, respectively. When the actuating shaft 46 is stopped by the actuator arm end 44 engaging the pin 45, as previously described, continued rotation of the spindle 61 results in shifting the plates 68 and 69 against the spring 70 to extend the separator blades 68*b* and 69*b* out beyond he spindle 61 to support a record stack above the bottom record thereof and to withdraw the shelves 68*a* and 69*a* within the spindle to permit the bottom record previously resting on the shelves to drop to the turntable. It is necessary to rotate the spindle 61 a total of 180° relative to the actuator shaft 65 to return the parts to normal rest position. Approximately 160° of this relative rotation is obtained by the actuator arm end 44 holding the pin 45 against movement while the spindle 61 continues to rotate and the remainder by the force of the spring 70 tending to return the plates 68 and 69 and reacting against the cam 73 to rotate the actuating shaft 46. The flange 62 on the spindle 61 provides proper phasing of record drop actuation with respect to the position of the tone arm 21 since it relates the spindle 61 and the cam 31 on the turntable together in proper angular relation.

When it is desired to remove one or more records from the turntable, the spindle 61 is removed to permit taking off the records and then replaced on the turntable.

In order to store the record spindle 61 when it is desired to play small hole records by placing them directly on the pin 11, an opening 80 is formed in the motorboard 1 in which a cup-shaped holder 81 may be inserted. This holder 81 has an upper rim 82 which rests on top of the motorboard and is formed integrally with a series of peripherally spaced ribs 83 which engage and hold the record spindle 61 when inserted therein. The holder 81 may be formed in a molding operation and, because of its shape, must necessarily be made of flexible material, both because of the molding operation involved and the intended use of the holder in securely holding the record spindle 61 by a slight deformation of the holder when the spindle is inserted. Suitable materials for making the holder are rubber or polyethylene plastic material which will not scratch the record spindle 61 and tend to flow around the edge of the opening in the motorboard in which it is inserted and hold the holder in place.

The holder 81 is additionally provided with an angularly spaced series of openings 84 in its bottom, any one of which may receive the flange 62 at the bottom of the record spindle 61, which aids in maintaining the spindle in a vertical position and also insures that the plates 68 and 69, and particularly their extensions forming the record supporting shelves and separator blades, will not extend outwardly in a direction to interfere with a large diameter record.

We claim:

1. A record changer comprising, in combination, a motorboard, a turntable positioned above the motorboard and mounted thereon for rotation, means for rotating the turntable, means on the turntable for supporting a record stack and for dropping a record onto the turntable, an actuating cam on the underside of the turntable having a terminal section inclined in a direction normal to the turntable, a tone arm, means including a rotatable tone arm shaft extending through the motorboard mounting the tone arm on the motorboard for movements in elevation and laterally of the turntable, an actuator arm for the tone arm and the record dropping means beneath the motorboard pivotally mounted adjacent one end on the tone arm shaft at an angle to the tone arm for movement in elevation relative to the tone arm shaft, an upwardly extending cam follower adjacent the other end of the actuator arm, means defining an elongated slot in the motorboard through which the cam follower may extend into the general area of the cam, a trip wire of non-magnetic material pivotally mounted on the motorboard with an L-shaped section extending downwardly from the motorboard and transversely beneath the level of the actuator arm and an angled upper trip end above the motorboard positioned adjacent the path of the cam terminal section, a magnetic armature on the downwardly extending part of the trip wire L-shaped section, a permanent magnet positioned on the actuator arm to lie to one side of the trip wire when adjacent thereto to attract the armature and to exert a pivoting action on the trip wire to place the angled trip end of the trip wire in the path of the cam terminal section to further pivot the trip wire as the turnable rotates and cause the L-shaped trip wire section to raise the actuator arm and cam follower into the area of the cam, said cam terminal section subsequently functioning to lower the actuator arm, and yieldable means for maintaining the actuator arm in either the raised or lowered position, the angular relation between the tone arm and actuator arm in their mounting on the tone arm shaft resulting in the permanent magnet being effective on the trip wire when the tone arm is in a trip position beyond the sound groove of a record and the tone arm is in a position to set down on a record when the cam follower is on the cam terminal section.

2. A record changer comprising, in combination, a motorboard, a turntable positioned above the motorboard and mounted thereon for rotation, means for rotating the turntable, an actuating cam on the underside of the turntable having a terminal section inclined in a direction normal to the turntable, a tone arm, means mounting the tone arm for movements in elevation and laterally of the turntable, an actuator arm beneath the motorboard, means mounting the actuator arm for simultaneous corresponding movements with the tone arm, an upwardly extending cam follower on the actuator arm, means defining an opening in the motorboard through which the cam follower may extend into the general area of the cam, a trip member pivotally mounted on the motorboard with an L-shaped section extending downwardly from the motor board and transversely beneath the level of the actuator arm and an angled upper trip end positioned adjacent the path of the cam terminal section, a permanent magnet positioned on the actuator arm to lie to one side of the trip member when adjacent thereto to exert a pivoting action on the trip member to place the angled trip end of the trip member in the path of the cam terminal section to further pivot the trip member as the turntable rotates and cause the L-shaped trip member section to raise the actuator arm and cam follower into the area of the cam, said cam terminal section subsequently functioning to lower the actuator arm, means for yieldably maintaining the actuator arm in either of the positions of elevation, the tone arm and actuator arm being angularly related so that the permanent magnet is effective on the trip member when the tone arm is off the sound groove of a record and the tone arm is in a position to set down on a record when the cam follower is on the cam terminal section, and means including an actuating shaft held stationary by the actuator arm when the tone arm is clear of the turntable for dropping a record onto the turntable.

3. A record changer comprising, in combination, a motorboard, a turntable, an actuating cam for a record changing cycle rotatable with the turntable and including an inclined terminal section, a tone arm, an actuator arm pivotally supported on the motorboard for lateral and raising and lowering movements, connections between the tone arm and actuator arm for causing said arms to have similar movements, said actuator arm having a cam follower selectively engageable with the cam for performing a record changing cycle, a magnetically responsive trip wire pivotally mounted on the motorboard and having a length thereof engageable with the actuator arm to raise the actuator arm and place the cam follower in the area of the cam when the trip wire is pivoted by engagement with the cam terminal section, and a permanent magnet on the actuator arm operable to initially pivot the trip wire by magnetic force into operative relation with the cam terminal section when the tone arm completes the tracking of a record and the magnet resultingly moves into operative relation with the trip wire.

4. A record changer comprising, in combination, a turntable having an actuating cam on its underside, an actuator arm extending under the turntable and having a cam follower selectively engageable with the cam, means mounting the actuator arm for raising and lowering movement and movement laterally of the turntable, a tone arm, connecting means between the actuator arm and tone arm for causing said arms to have similar movements, a magnetically responsive pivotally mounted trip member for moving the actuator arm and cam follower into cam engaging position when moved by the cam, and magnetic means carried on the actuator arm for pivoting the trip member by magnetic force into cam engaging position when the tone arm completes the tracking of a record and the magnetic means resultingly moves into operative relation with the trip member.

5. A record changer comprising, in combination, a turntable having an actuating cam with an inclined terminal section on its underside, an actuator arm extending under the turntable and having a cam follower selectively engageable with the cam, means mounting the actuator arm for raising and lowering movement and movement laterally of the turntable, a tone arm, connecting means between the actuator arm and tone arm for causing said arms to have similar movements, a magnetically responsive trip wire pivotal on an axis for raising the actuator arm and cam follower when moved by the cam terminal section, and a permanent magnet carried on the actuator arm for pivoting the trip wire by magnetic force into cam engaging position when the tone arm completes the tracking of a record and the permanent magnet is positioned to a side of the trip wire pivotal axis.

6. A record changer comprising, in combination, a motorboard, a turntable, an actuating cam rotatable with the turntable, an actuator arm having a cam follower adjacent one end selectively engageable with the cam, means mounting the actuator arm for raising and lowering movement and movement laterally of the turntable, a tone arm, connecting means between the actuator arm and tone arm for causing said arms to have similar movements, an elongated trip member pivotally mounted on the motorboard for raising the actuator arm and cam follower into cam engaging position when moved by the cam, a magnetic armature on the trip member, and a permanent magnet carried on the actuator arm for attracting the armature and pivoting the trip member about an axis transverse to the length of the actuator arm into cam engaging position when the tone arm passes onto the terminal groove of a record and said magnet is in operative relation with the armature.

7. In a record changer having a motorboard, a turntable rotatably mounted on the motorboard, a rotatable actuating cam, a tone arm shaft remote from the turntable rotatably mounted on the motorboard with an upper end above and a lower end below the motorboard, a tone arm extending from the tone arm shaft having an end pivotally connected to the upper end of said shaft for raising and lowering movement, an elevating abutment on the tone arm adjacent its pivotally connected end, an actuator arm pivotally connected at one end to the lower end of the shaft for raising and lowering movement and having a cam follower at its opposite end selectively engageable with said actuating cam, an upwardly extending elevator arm on the actuator arm underlying the tone arm adjacent the tone arm shaft in sliding engagement with the elevating abutment on the tone arm for transmitting raising and lowering movements to the tone arm corresponding to those of the actuator arm, said tone arm shaft causing simultaneous movement of the tone arm and actuator arm laterally of the turntable, means defining an opening in the motorboard through which the elevator arm extends, and a detent for holding the actuator arm either in a raised position or a lowered position wherein the elevator arm is out of engagement with the elevating abutment of the tone arm.

8. A record changer comprising, in combination, a motorboard, a turntable having an actuating cam for a record changing cycle including an inclined terminal section, speed selector means for the turntable, a tone arm and an actuator arm both pivotally supported for lateral and raising and lowering movements with respect to the turntable, connections between the tone arm and actuator arm for causing said arms to have similar movements, said actuator arm having a cam follower selectively engageable with the cam for performing a record changing cycle, a trip member pivotally mounted on the motorboard and having a section thereof underlying and engageable with the actuator arm to raise the actuator arm and place the cam follower in the area of the cam when the trip member is pivoted by engagement with the cam terminal section, a permanent magnet on the actuator arm to initially pivot the trip member into operative relation with the cam terminal section operable by the tone arm completing the playing of a record, a manually operable lever pivoted on the motorboard and having an end with a pair of spaced legs forming a U-shape lying on opposite sides of the trip member, said lever having a neutral position in which one leg thereof is spaced from the trip member to permit magnet operation of the the trip member, and means responsive to certain settings of the speed selector means for holding the lever in another position of rotation wherein the last referred to leg is closely adjacent the trip member to prevent movement of the trip wire by the magnet to permit manual operation, said lever when rotated in the opposite direction causing the second of said legs to initially pivot the trip member to initiate a record changing cycle.

9. A record changer comprising, in combination, a tone arm, a motorboard, a turntable, an actuating cam for a record changing cycle rotatable with the turntable including an inclined terminal section, an actuator arm mounted for raising and lowering movement having a cam follower selectively engageable with the cam for performing a record changing cycle, a trip member pivotally mounted on the motorboard for moving the actuator arm to place the cam follower in the area of the cam when pivoted by engagement with the cam terminal section, means on the actuator arm coacting with the trip member to initiate a normal record changing cycle, a lever pivoted on the motor board having an end bent to lie on both sides of the trip member whereby movement of the lever in one direction will move the trip member into operative relation with the cam for a record change cycle and movement of the lever in the other direction will block movement of the trip member to permit manual operation of the tone arm, speed selector means for the turntable, and means responsive to certain settings of the speed selector means to move the lever in said other direction.

10. A record changer comprising, in combination, a tone arm, a turntable having an actuating cam for a record changing cycle, an actuator arm mounted for raising and lowering movement having a cam follower selectively engageable with the cam for performing a record changing cycle, a pivotally mounted magnetically responsive trip wire for moving the actuator arm to place the cam follower in the area of the cam when pivoted by engagement with the cam, a permanent magnet on the actuator arm coacting with the trip wire to pivot the trip wire into engagement with the cam to initiate a normal record changing cycle, a manually operable lever having an end bent to lie on both sides of the trip wire whereby movement of the lever in one direction will move the trip wire into operative relation with the cam for a record change cycle and movement of the lever in the other direction will block movement of the trip wire to permit manual operation of the tone arm.

11. A record player comprising, in combination, a turntable having an actuating cam for a record changing cycle, manually settable means for driving the turntable at a plurality of different speeds, an actuator arm mounted for raising and lowering movement having a cam follower selectively engageable with the cam for performing a record changing cycle, a tone arm connected to the actuator arm for movement therewith, a pivotally mounted trip wire for moving the actuator arm to place the cam follower in the area of the cam when pivoted by engagement with the cam, a permanent magnet on the actuator arm coacting with the trip wire to initially move the trip wire into engagement with the cam to initiate a normal record changing cycle, a manually operable lever having a pair of legs arranged to lie on both sides of the trip wire and arranged to permit initial movement of the trip wire by the magnet when said lever is in an automatic operation position and whereby movement of the lever in one direction will cause one leg to move the trip wire into operative relation with the cam for a record change cycle, said lever having a manual operation position in which the other leg blocks movement of the trip wire to permit manual operation of the tone arm, and means responsive to the speed setting of the speed selecting means for the turntable either to maintain the lever in its automatic operation position or its manual operation position.

12. In a record changer, a turntable, manually settable means for driving a turntable at a plurality of different speeds, a tone arm, means operative upon completion of playing of a record for initiating a record change cycle including movements of the tone arm, and means responsive to the setting of said turntable drive means at certain speeds for preventing the operation of the record change cycle initiating means and initiation of a record change cycle to permit manual operation of the tone arm.

References Cited in the file of this patent

UNITED STATES PATENTS

| | | |
|---|---|---|
| 2,085,582 | Guedon | June 29, 1937 |
| 2,343,992 | Morrison | Mar. 14, 1944 |
| 2,397,932 | Erwood et al. | Apr. 9, 1946 |
| 2,608,411 | Fisher | Aug. 26, 1952 |
| 2,634,135 | Carson | Apr. 7, 1953 |
| 2,652,729 | Dale | Sept. 22, 1953 |
| 2,662,772 | Dobrogowski et al. | Dec. 15, 1953 |
| 2,801,109 | Vistain | July 30, 1957 |